Oct. 29, 1946.    C. L. DEWEY    2,410,052
TUBE REDUCING MACHINE
Filed June 19, 1944    6 Sheets-Sheet 6
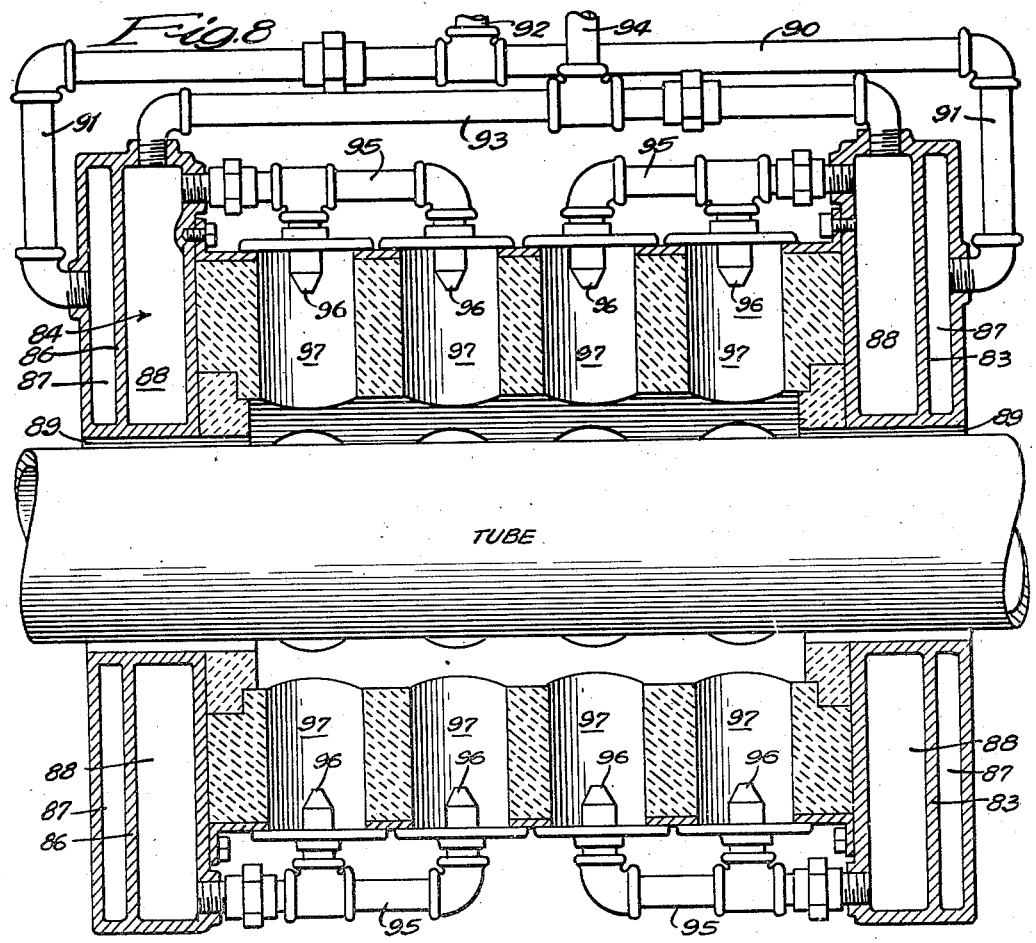
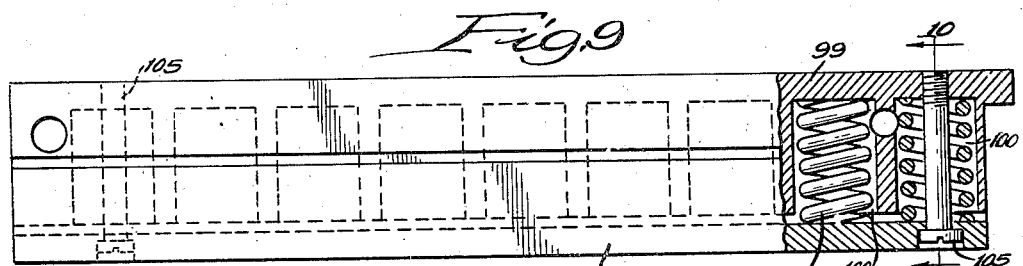
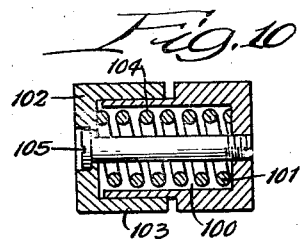

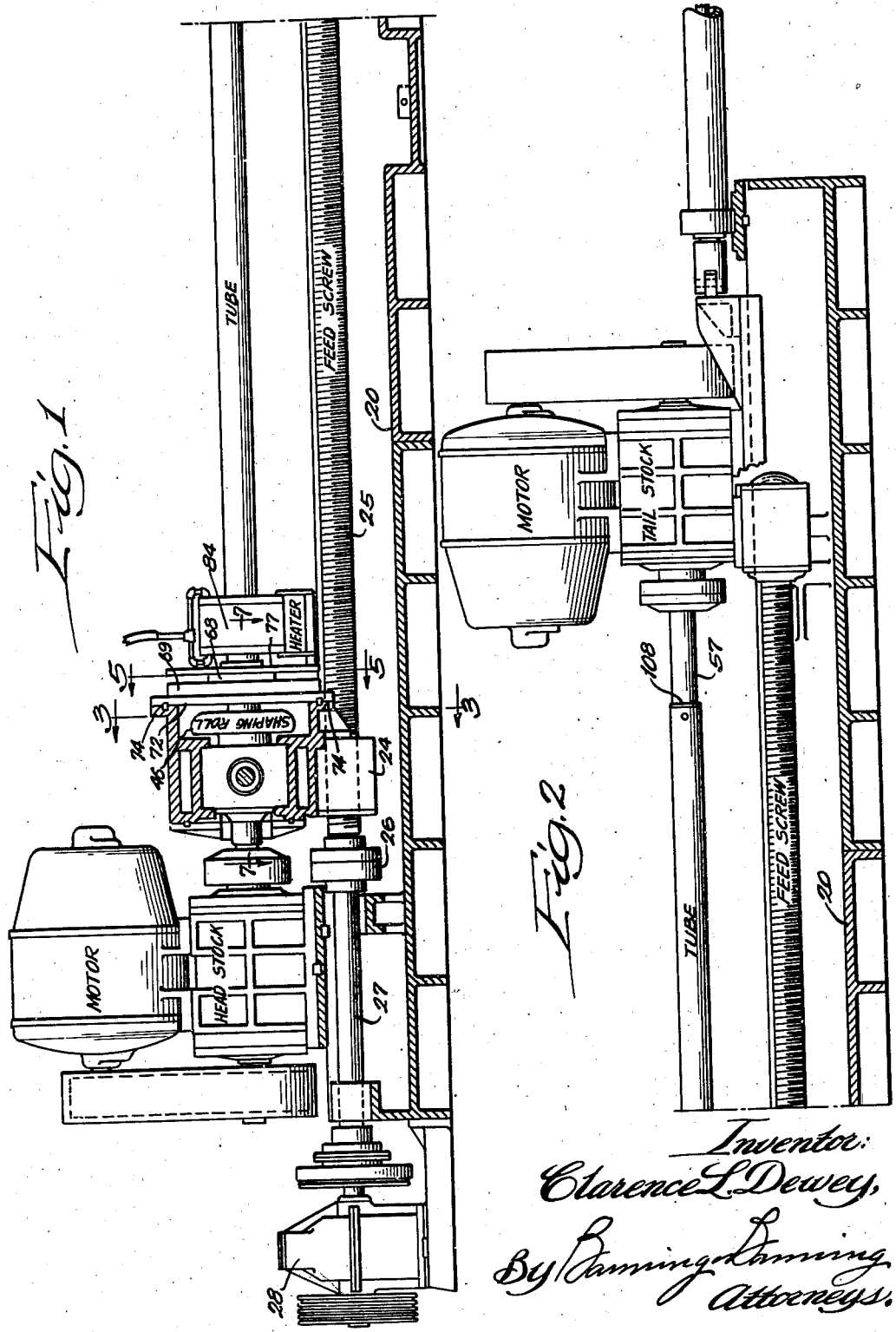

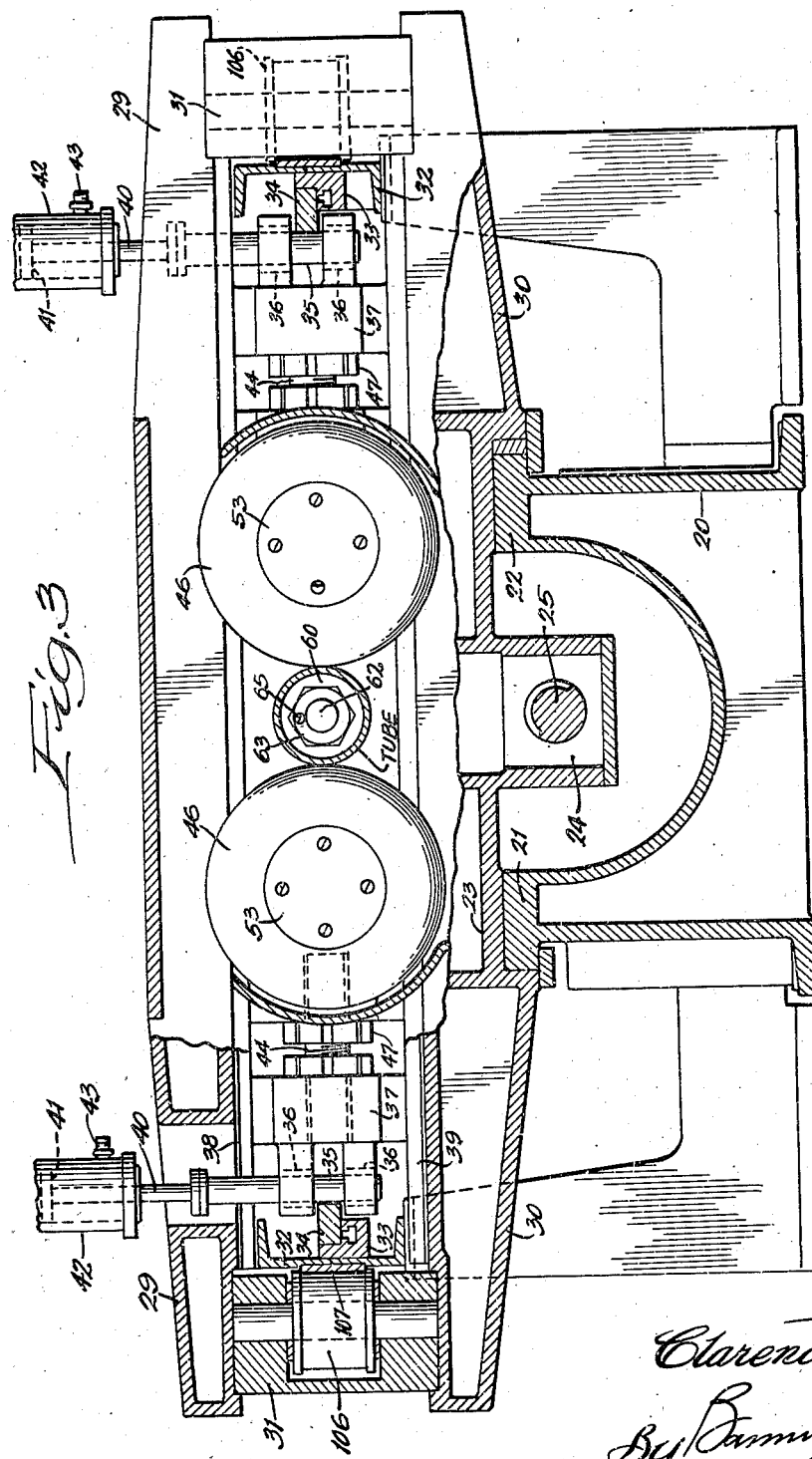

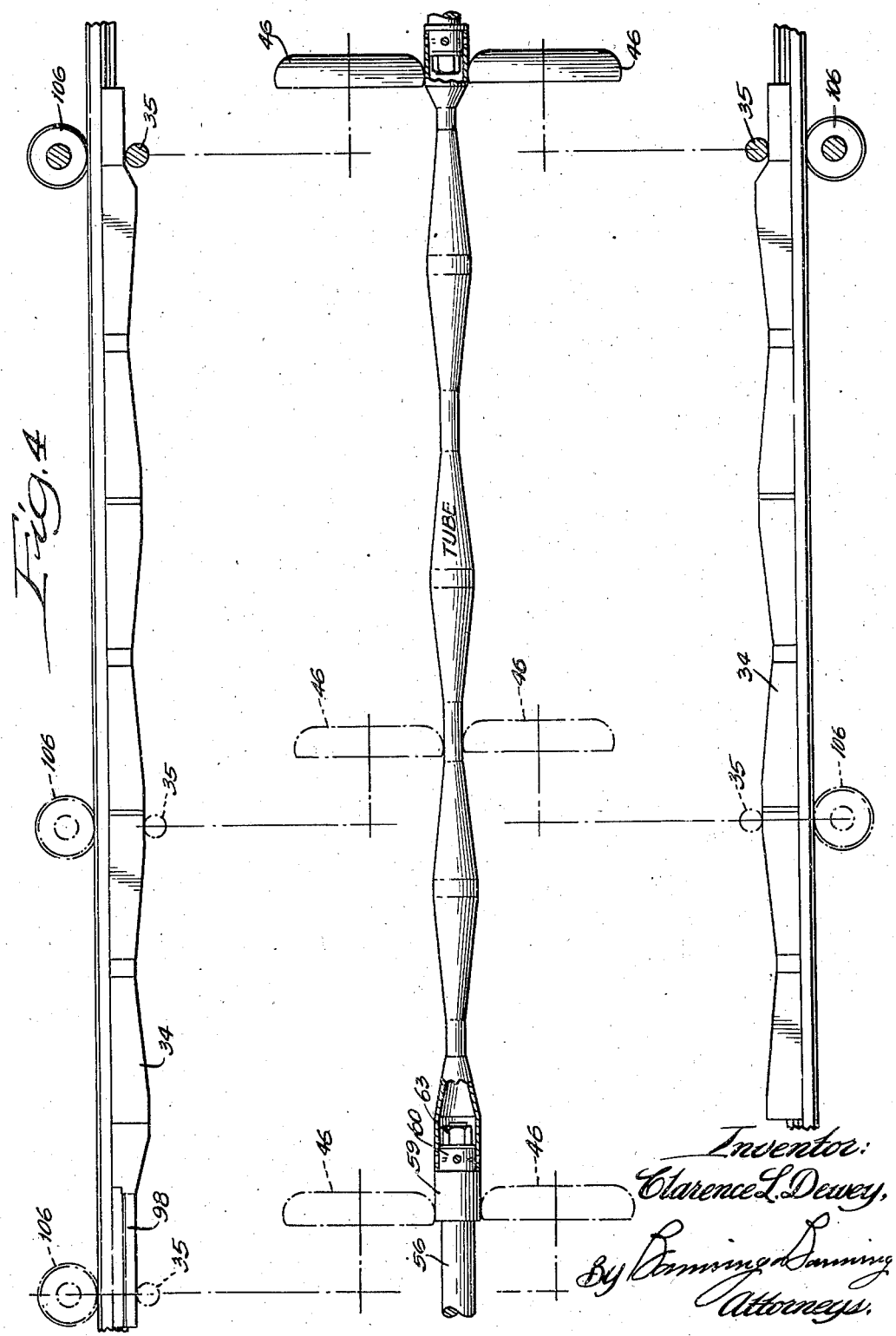

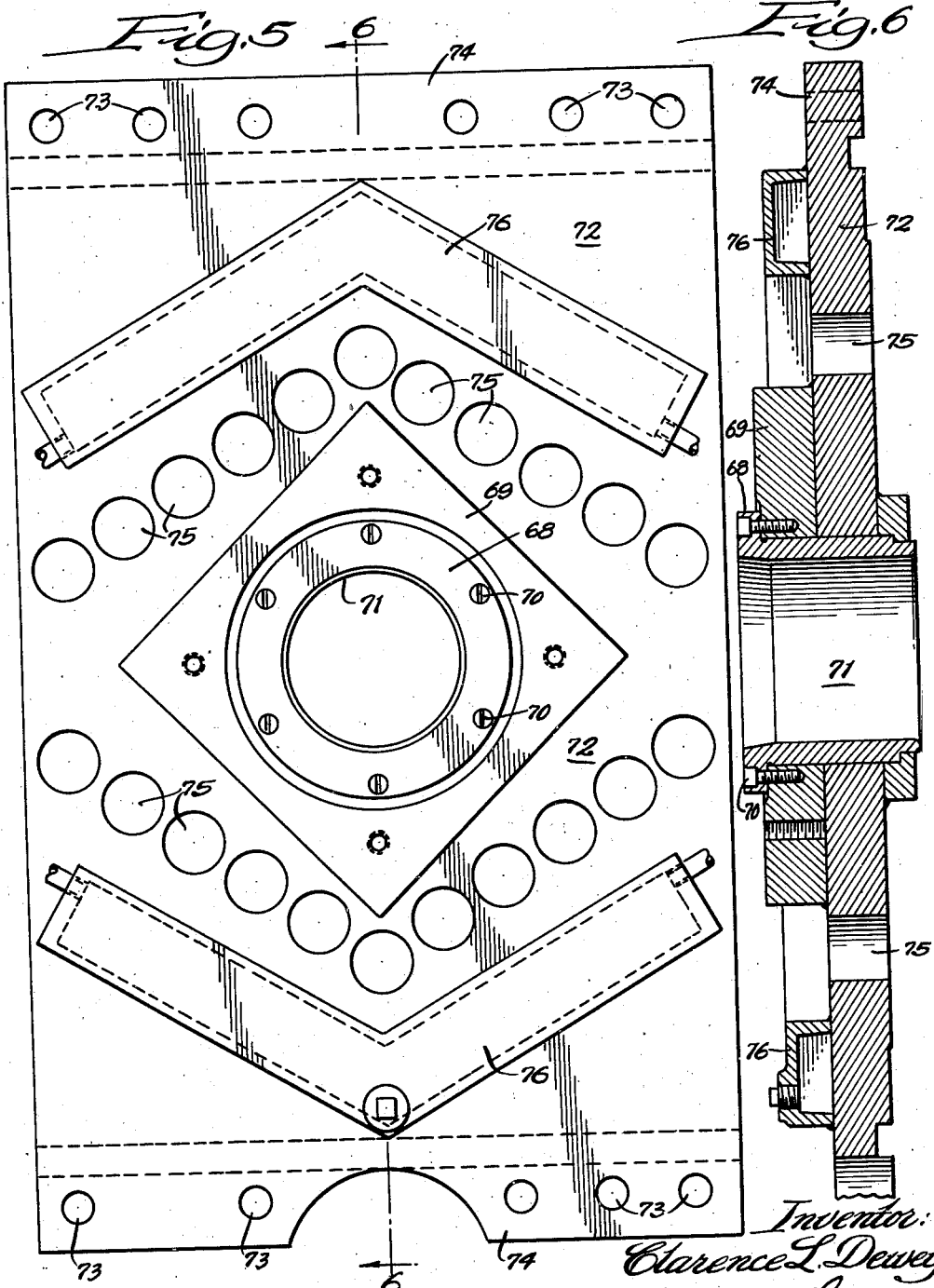

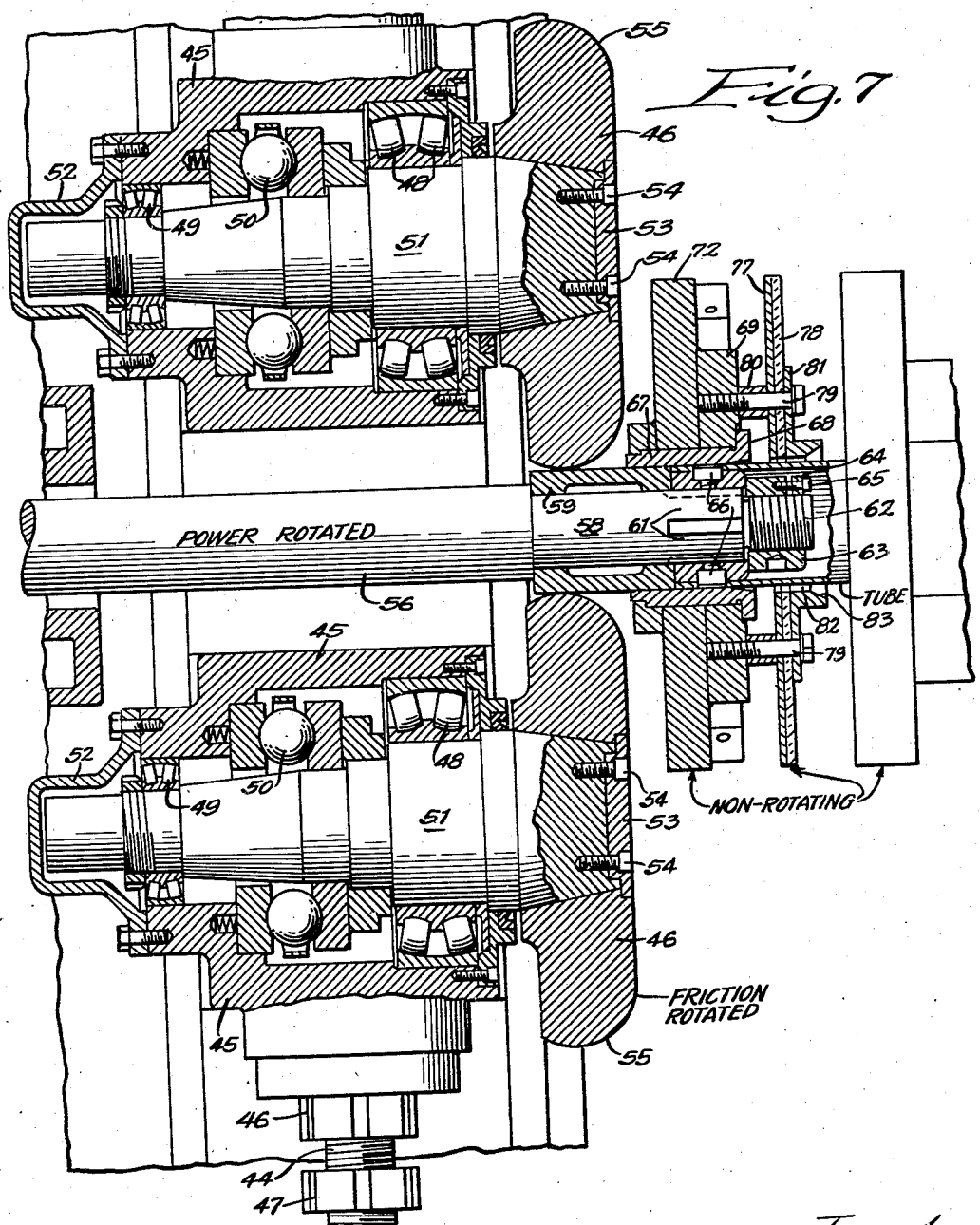

Patented Oct. 29, 1946

2,410,052

UNITED STATES PATENT OFFICE 2,410,052

TUBE REDUCING MACHINE

Clarence L. Dewey, Elkhart, Ind., assignor to Bendix Aviation Corporation, South Bend, Ind., a corporation of Delaware Application June 19, 1944, Serial No. 541,018

12 Claims. (Cl. 113—53)

In the reducing and configuring of tubing in conformity with the method described and claimed in the Dewey Patent No. 2,265,723 of December 9, 1941, it is often desirable, especially in the configuring of large thick-walled tubing, to locally heat the tubing at a point immediately adjacent the restricted area undergoing deformation in order to soften the metal and assist its flow under the pressure of the reducing rolls. In order to exteriorly reenforce the tubing adjacent the region of deformation, it has been found necessary to provide a surrounding sleeve or reenforcing bushing which should fit snugly around the tube in order to properly center the same and thus secure uniformity and true circularity in cross-section with a proper regulation of the wall thickness in conformity with the principles outlined in the patent aforesaid.

Since the section of tubing is relatively rotated at a high rate of speed, and since it must be fed through the reenforcing bushing as the reduction progresses, it was heretofore believed to be highly desirable to mount the bushing in bearings so that it might rotate freely with the tube section in the manner shown in the patent aforesaid, and also in the Dewey Patent No. 2,330,811 of October 5, 1943. Experience has shown, however, that in cases where a high degree of heat is applied locally to the advancing tube section, there occurs a resultant expansion in the surrounding bushing which in course of time will cause it to freeze within its bearings so that further rotation will be prevented.

In the effort to overcome this difficulty, an appreciable degree of clearance was provided for the bushing within its bearings while cold, but this resulted in a loose fitting of the parts so that accurate centering and uniformity in production was seriously impaired. After repeated experimentation, it was found, however, that if the bushing were made of a metal highly resistant to the effects of heat and were fixedly locked in position, the tubing at a high temperature and in a relatively soft condition could be fed through the fixed bushing without difficulty and it was also found that the rotation of the tube within the fixed bushing had the effect, while heated, of smoothly polishing the surface and avoiding the formation of scale so that the resultant product was not only more uniformly configured, but was discharged from the machine with a smooth unpitted or unbroken surface which is highly essential in the configuring of tubing for structural purposes in which strength, toughness, and integrity of the tube surface are essential.

The present invention is directed to a machine for configuring tubing in conformity with the conditions above specified, and in making provision for the localized heating of the tubing at a point immediately adjacent the region of deformation, and in conserving the heat thus applied. The invention further consists in the chuck means, provided for engaging the ends of the tube section in such a way as to initially impart full frictional rotation to the rolls by contact with the rotating chuck in advance of the tubing, so that when the latter reaches the rolls they will be rotating at equal surface speed, and will not therefore slip against the tube surface with resultant stripping of scale particles from the hot tube and grinding them into the relatively soft surface, thus impairing the integrity of the finished product. The invention further consists in the general structure of the machine as a whole in such a way as to adequately conform to the principles of operation above set forth.

In the drawings:

Figure 1 is a longitudinal sectional view of the head stock end of the machine with the carriage in the rearmost position which it assumes at the beginning of the operation.

Fig. 2 is a continuation showing the tail stock end of the machine.

Fig. 3 is an enlarged cross-sectional view taken on line 3—3 of Fig. 1 in the direction of the arrows.

Fig. 4 is a diagrammatic view showing the templates with a section of the tubing and indicating various positions of the forming rolls.

Fig. 5 is a face view of the reenforcing bushing and the mounting therefor taken on line 5—5 of Fig. 1 in the direction of the arrows.

Fig. 6 is a sectional elevation of the same taken on line 6—6 of Fig. 5 in the direction of the arrows.

Fig. 7 is a sectional view of the shaping rolls and their mountings.

Fig. 8 is a longitudinal sectional view taken through the heater showing a portion of the tubing advancing therethrough.

Fig. 9 is a view partly in section of the resilient end portion of one of the templates, and Fig. 10 is a cross-sectional view taken on line 10—10 of Fig. 9 in the direction of the arrows.

The machine as a whole is mounted upon a bed 20 provided with tracks rails 21 and 22 which support a carriage 23 having depending from its center, a rider 24 through which is threaded a feed screw 25 connected by a coupling 26 with a feed shaft 27 suitably journalled within the bed and carrying a pulley 28 connected with a suitable source of power for rotating the feed screw at a relatively slow rate to advance the carriage from the left hand position shown in Fig. 1 at the head stock end of the machine toward the tail stock end shown in Fig 2.

The carriage is laterally extended beyond the rails 21 and 22 by the provision of upper and lower wings 29 and 30 which are preferably cored as shown in Fig. 3 to provide for the circulation of a coolant. The upper and lower wings on each side are connected by a spacer block 31 which moves in adjacent relation to a template beam 32 of channel formation each of which beams is provided on its inner face with an L shaped supporting bar 33 which carries a plurality of template sections 34 of proper configuration along their inner edges and arranged end to end so that collectively they will provide an extended template on each side whose acting inner face has a configuration complementary to that of the intended profile of the tube section to be configured.

The configured inner edges of the respective templates bear against roller stems 35 which are journalled within lugs 36 outwardly extending from a slide block 37 guided for transverse movement between upper and lower guide rails 38 and 39 extending transversely of the carriage. The roller stems 35 extend upwardly above the journal mountings and are connected in each case to a piston stem 40 carrying a piston 41 located within a cylinder 42 suitably supported on the carriage and adapted to be elevated by the admission of fluid pressure through a nipple 43 which permits the roller stems to be elevated out of contact with the templates when it is desired to effect a quick return of the carriage to its starting position.

Each of the slide blocks 37 is connected by means of a threaded stem 44 (Fig. 7) with a journal housing 45 which permits the housing to be adjusted in or out, independently of the action of the templates in order to initially provide the intended maximum spacing for the shaping rolls 46 to operate upon tubing of the intended diameter. After the initial adjustment has been made, the parts are held in fixed relation by the tightening of nuts 47.

The journal housing is cored to provide mountings for inner and outer roller bearings 48 and 49 and thrust ball bearings 50 which serves to journal the stepped shaft 51 of the shaping roll 46, the outer end of the shaft being enclosed by a cap 52 and the roll being held in wedging relation upon the tapered inner end of the shaft by a clamping plate 53 secured by bolts 54. This arrangement provides an extended bearing for the roller shaft and affords a rugged mounting therefor to enable it to withstand the severe pressures exerted upon the acting edge of each roll during the tube reducing and configuring operation.

The acting edge 55 of the roll 46 is rounded, and by varying the configuration of the acting edge, the wall thickness of the configured tubing can be regulated in conformity with the principles set forth in the Dewey Patent No. 2,265,723 aforesaid. Also it should be understood that the present invention is not directed primarily to the formation of the rolls or the means provided for regulating their in and out movements and that these features of the machine as described serve merely for purposes of exemplification and may be modified in various ways without departing from the spirit of the invention which relates more particularly to the features now to be described.

It is desirable, in cases where the tubing is to be locally heated to a relatively high temperature, that the tube be positively rotated from each end and with this purpose in view, the tubing is connected at opposite ends to a head stock chuck shaft 56 and a tail stock chuck shaft 57. The head stock shaft is reduced at its inner end 58 to receive a hardened chuck sleeve 59 which is rigidly clamped in position by a mounting ring 60 which is grooved to slip on to splines 61 formed in the end of the shaft section 58 which latter terminates in a reduced threaded stem 62 which receives a lock nut 63 which is provided with a split section 64 through which is entered a bolt 65 adapted to compress the threading of the lock nut in order to hold it rigidly in position. The lock nut bears directly against the end of the mounting ring 60 which has an exterior diameter slightly less than the diameter of the chuck sleeve 59 so that when the end of the tubing is slipped thereon, its exterior surface will lie flush with the surface of the hardened chuck sleeve so that a continuous unbroken surface will be presented for the contact of the shaping rolls. The tube is rigidly held against slippage by the provision of head bolts 66 which are entered through the tube and into the mounting ring.

Immediately in advance of the shaping rolls is located a non-rotatable reenforcing bushing 67, the details of which are best illustrated in Figs. 5, 6, and 7. The bushing is preferably formed of white cast iron with 1% chrome, which is a material which withstands greater heat than that applied to the tubing, which will ordinarily be initially heated to a temperature of 1600° F. which cools to about 1500° F. as it goes through the shaping rolls. The bushing is of an inside diameter to closely embrace the chuck sleeve 59 at the beginning of the reducing operation and thereafter to travel forward or to the right of the drawings and closely encircle the hot tubing at a point immediately in advance of the rolls, since both the bushing and the heater presently to be described are mounted upon the carriage frame and travel as a unit with the rolls and the mountings therefor. The reenforcing bushing is provided at its forward end with a flange 68 which bears against the face of a square plate 69 (Fig. 5) to which it is secured by bolts 70. The bushing is throated at its forward end 71 to provide an easy entrance for the tube, and the plate 69 is welded to the forward face of a backing plate 72. The latter is secured to the carriage frame by bolts, not shown, entered through bolt holes 73, which bolts serve to unite the backing plate to flanges 74 (Fig. 1) at the upper and lower edges of the carriage frame.

In order to reduce the effect of expansion and contraction under heat, the backing plate is provided with rows of apertures 75 which reduce the continuity of the metal body and afford clearance areas adapted to prevent warping or buckling of the plate as a whole, and in order to further compensate against excessive heating, U shaped channel boxings 76 are welded to the face of the shield to provide passages for the flow of a coolant.

Immediately in advance of the reenforcing bushing, but in spaced relation to the throated end, is located a shield 77 having an asbestos facing 78 and connected to the plate 69 by bolts 79 passed through spacers 80. The facing 78 is held in place by a clamping plate 81, and the shield structure is provided in the center with an aperture 82 which also extends through a throated flange 83, the diameter of the aperture being substantially greater than the diameter of the tube, so that the throated flange 83 will provide means for converging the hot gases from the heater inwardly around the wall of the tube so as to maintain the heating effect on the tube at a point quite closely adjacent to the shaping rolls so that the tube will have little opportunity for cooling before it is brought to the region of deformation. The tube is heated to a high temperature by passage through a heater 84 which is rigidly supported from the carriage frame and travels therewith and the heater is of a type which is well adapted to localized heating to a high degree and in a short space of time. The heater as shown in Fig. 8 is of drum shaped configuration provided with a forward head 85 and a rear head 86, each of the heads being cored to provide an outer water chamber 87 and an inner gas chamber 88, each of the heads being provided with an aperture for the passage of the tube to be heated. The water chambers are connected by a header pipe 90 having at each end a depending leg 91 which is entered through the wall of the adjacent water chamber and the header connects with a supply pipe 92 through which a coolant is admitted for circulation through the heater heads. A gas mixture of high thermal content is admitted to the gas chambers through a header 93 connecting with a gas pipe 94 and each of the gas chambers is provided on its inner wall with a ring of discharge pipes 95 connected with inwardly projecting burner nozzles 96 each of which discharges into a combustion chamber 97 having walls of refractory material which constitutes the inner structure of the heater and thus provides rows of radiating combustion chambers inwardly opening toward the center and in position to allow the hot products of combustion to play upon the surface of the tube. It will be understood, however, that the specific construction of the heater itself is of standard commercial form, and that the heating unit per se does not constitute a novel feature of the present invention.

It will be noted from Fig. 7 that in the adjustment shown, the shaping rolls bear directly upon the surface of the hardened chuck sleeve 59 and in order to maintain this initial roller adjustment, the template, at the corresponding point, is provided with a spring backed unit 98 (Figs. 4, 9, and 10) which comprises a backing section 99 which is cored to provide a plurality of spring socket recesses 100 within which are housed coiled springs 101 which bear upon an inner facing section 102 of channel formation having side walls 103 which telescope on guide walls 104 inwardly projecting from the backing section. Entered through each spring is a headed bolt for limiting the movements of the facing section. The arrangement shown is one which provides a slight degree of resiliency to the face of the template at this point and serves to hold the rollers under spring tension firmly against the surface of the chuck sleeve at the starting operation. In order to reenforce the template as a whole against outward bending or yielding under the thrusts of the shaping rolls, each of the spacer blocks 31 of the carriage has journalled therein a backing roll 106 which bears against a hardened face plate 107 on the template beam so that the beam will thus be continuously reenforced against yielding at the point where the thrust is centered.

The chuck at the tail stock end of the machine is substantially similar to the chuck at the head stock end with the exception that a somewhat elongated chuck sleeve is omitted and the end of the tube is abutted against a flange 108.

*Operation*

In preparation for the reduction and configuring of the tubing, the carriage is restored to the rearmost position shown in Fig. 1 in which it is brought into close proximity to the head stock and with the shaping rolls in resilient contact with the chuck sleeve 59. Thereafter power is applied, and the feed screw begins to advance the carriage toward the right in Fig. 1 while at the same time a high speed of rotation is imparted to the chuck shafts at each end of the machine through power derived from a motor and transmission belt combination mounted on the head and tail stock respectively. The high speed of rotation of the tube, in relation to the slow linear feeding speed of the rolls insures that during the advance of the rolls along the tubing, each portion of the tube wall will be repeatedly subjected to roll contact in conformity with the principles set forth in the Dewey patent aforesaid so that appreciable spiral grooving will be prevented, and a smooth tube surface will be maintained as the tube is acted upon within the region of deformation.

However, before the rolls reach the contiguous end of the tube, they will bear heavily upon the rotating surface of the chuck sleeve 59 so that a high speed of rotation will be imparted by friction to the rolls themselves, and this is of major importance in preventing the pick up of scale from the tube surface which is liable to occur if the rolls while non-rotating were brought immediately into contact with the tube and acquired rotative movement by contact therewith rather than by preliminary contact with the smooth hardened surface of the chuck sleeve. Thus, as the carriage advances toward the tube end, the rolls will build up to full speed of frictional rotation so that when they reach the tube, there will be no slippage between the contacting surfaces which if permitted would result in the adhesion of scale particles to the roll surface, or the imbedment of scale in the hot surface of the tube with a consequent biting or scarring of the tube surface.

As the carriage advances, the section of the tube immediately adjacent the region of deformation will be heated to a high degree, of approximately 1600° F., and the clearance afforded around the tube will permit the hot gases and the flames to play around the tube surface and through the aperture in the shield 77 so that the heating of the tube will occur at a point sufficiently close to the shaping rolls to maintain the temperature of the tube at a high degree—substantially 1500° F.—at the time the rolls contact the surface without, however, distributing the heat to more distant portions of the tube.

The heating and softening of the tube will permit the fixed reenforcing bushing to slip smoothly and evenly along the tube surface while maintaining an extremely close compressive contact therewith which prevents any play or vibration of the tube within the bushing and avoids the difficulties experienced in the employment of a rotating bushing which if expanded by contact with a highly heated tube might tend to freeze in its bearing unless the bearing fit were made so loose as to impair the centering and reenforcing functions of the bushing.

It has been found from experience that in order to guard against twisting of a highly heated tube under the conditions above described, it is highly desirable to positively rotate the tube at each end, and by the employment of the mechanism here described, it is possible to reduce and abruptly configure thickwalled tubing of relatively large diameter which it would be impossible to satisfactorily configure by a cold working process. Although it has heretofore been attempted to apply localized heating to tubing under reduction, it has been found from repeated experiment that in order to secure satisfactory results in the production of configured tubing of high quality and free from imperfections that it is necessary to apply the heat and reenforce the tubing in substantially the manner described, and to speed up the rotation of the shaping rolls to the surface speed of the tubing itself before contact is established therewith. The structure of the present machine conforms to the above requirements and at the same time provides a mechanism for effectively applying the heat and in actuating the operating parts in such a way as to attain a high rate of production of tubing with a minimum of expenditure of power and gas. Although the invention has been described in full detail, it will be understood that modifications may be made in the general structure of the machine without departing from the spirit of the invention.

I claim:

1. In a tube reducing machine, the combination of a pressure roll and means for moving the same radially with respect to the axis of the tube, a heater located closely in advance of the roll and in position to permit the tube to pass relatively therethrough, a reenforcing heat resisting bushing positioned to closely surround the wall of the tube and located intermediate the heater and the roll to exteriorly reenforce the tube immediately in advance of the roll, means for mounting the heater, bushing and pressure roll as a unit and restraining the bushing from rotation, and means for relatively advancing said unit longitudinally of the tube and rotating the tube relatively to the agencies comprising said unit.

2. In a tube reducing machine, the combination of a pressure roll and means for moving the same radially with respect to the axis of the tube, a heater located closely in advance of the roll and in position to permit the tube to pass relatively therethrough, a reenforcing heat resisting bushing positioned to closely surround and frictionally embrace the wall of the tube and located intermediate the heater and the roll to exteriorly reenforce the tube immediately in advance of the roll, means for mounting the heater, bushing and pressure roll as a unit and restraining the bushing from rotation, and means for relatively advancing said unit longitudinally of the tube and rotating the tube relatively to the agencies comprising said unit.

3. In a tube reducing machine, the combination of a pressure roll and means for moving the same radially with respect to the axis of the tube, a heater located closely in advance of the roll and in position to permit the tube to pass relatively therethrough, a reenforcing bushing positioned to closely surround the wall of the tube and located intermediate the heater and the roll to exteriorly reenforce the tube immediately in advance of the roll, means for mounting the heater, bushing and pressure roll as a unit, and means for relatively advancing said unit longitudinally of the tube and rotating the tube relatively to the agencies comprising said unit, said means including a chuck provided with a terminal portion adapted to fit into the end of the tube and an adjacent portion of increased diameter adapted to maintain flush relation to the surface of the tube wall to permit contact of the roll therewith before contact is established with the tube.

4. In a tube reducing machine, the combination of a pressure roll and means for moving the same radially with respect to the axis of the tube, a heater located closely in advance of the roll and in position to permit the tube to pass relatively therethrough, a reenforcing bushing positioned to closely surround and frictionally embrace the wall of the tube and located intermediate the heater and the roll to exteriorly reenforce the tube immediately in advance of the roll, means for mounting the heater, bushing and pressure roll as a unit, and means for relatively advancing said unit longitudinally of the tube and rotating the tube relatively to the agencies comprising said unit, said means including a chuck provided with a terminal portion adapted to fit into the end of the tube and an adjacent portion of increased diameter adapted to maintain flush relation to the surface of the tube wall to permit contact of the roll therewith before contact is established with the tube.

5. In a tube reducing machine, the combination of a pressure roll and means for moving the same radially with respect to the axis of the tube, a heater located closely in advance of the roll and in position to permit the tube to pass relatively therethrough, a reenforcing bushing positioned to closely surround the wall of the tube and located intermediate the heater and the roll to exteriorly reenforce the tube immediately in advance of the roll, a heat resisting shield having a throated aperture for the passage of the tube adapted to converge heat against the tube wall and located between the heater and the bushing, means for mounting the heater, shield, bushing and pressure roll as a unit, and means for relatively advancing said unit longitudinally of the tube and rotating the tube relatively to the agencies comprising said unit.

6. In a tube reducing machine, the combination of a pressure roll and means for moving the same radially with respect to the axis of the tube, a heater located closely in advance of the roll and in position to permit the tube to pass relatively therethrough, a reenforcing bushing positioned to closely surround and frictionally embrace the wall of the tube and located intermediate the heater and the roll to exteriorly reenforce the tube immediately in advance of the roll, a heat resisting shield having a throated aperture for the passage of the tube adapted to converge heat against the tube wall and located between the heater and the bushing, means for mounting the heater, shield, bushing and pressure roll as a unit, and means for relatively advancing said unit longitudinally of the tube and rotating the tube relatively to the agencies comprising said unit.

7. In a tube reducing machine, the combination of a pressure roll and means for moving the same radially with respect to the axis of the tube, a heater located closely in advance of the roll and in position to permit the tube to pass relatively therethrough, a reenforcing bushing positioned to closely surround the wall of the tube and located intermediate the heater and the roll to exteriorly reenforce the tube immediately in advance of the roll, a heat resisting shield having a throated aperture for the passage of the tube adapted to converge heat against the tube wall and located between the heater and the bushing, means for mounting the heater shield, bushing and pressure roll as a unit, and means for relatively advancing said unit longitudinally of the tube and rotating the tube relatively to the agencies comprising said unit, said means including a chuck provided with a terminal portion adapted to fit into the end of the tube and an adjacent portion of increased diameter adapted to maintain flush relation to the surface of the tube wall to permit contact of the roll therewith before contact is established with the tube.

8. In a tube reducing machine, the combination of a pressure roll and means for moving the same radially with respect to the axis of the tube, a heater located closely in advance of the roll and in position to permit the tube to pass relatively therethrough, a reenforcing bushing positioned to closely surround and frictionally embrace the wall of the tube and located intermediate the heater and the roll to exteriorly reenforce the tube immediately in advance of the roll, a heat resisting shield having a throated aperture for the passage of the tube adapted to converge heat against the tube wall and located between the heater and the bushing, means for mounting the heater, shield, bushing and pressure roll as a unit, and means for relatively advancing said unit longitudinally of the tube and rotating the tube relatively to the agencies comprising said unit, said means including a chuck provided with a terminal portion adapted to fit into the end of the tube and an adjacent portion of increased diameter adapted to maintain flush relation to the surface of the tube wall to permit contact of the roll therewith before contact is established with the tube.

9. In a tube reducing machine, the combination of a pressure roll and means for moving the same axially along the tube, a heater located closely in advance of the roll and in position to heat the tube, a reenforcing heat resisting bushing positioned to closely surround the wall of the tube and located intermediate the heater and the roll to exteriorly reenforce the tube immediately in advance of the roll, means for mounting the heater, bushing and pressure roll as a unit and restraining the bushing from rotation, and means for relatively advancing said unit longitudinally of the tube and rotating the tube relatively to the agencies comprising said unit.

10. In a tube reducing machine, the combination of a pressure roll, means for moving the same along the tube, heating means for heating the tube in advance of the roll, means for relatively advancing the roll longitudinally of the tube and means rotating the tube including a chuck provided with a terminal portion adapted to fit into the end of the tube and an adjacent portion of increased diameter adapted to maintain flush relation to the surface of the tube wall to permit contact of the roll therewith before contact is established with the tube.

11. In a tube reducing machine, the combination of a pressure roll, means for moving the same along the tube, heating means for heating the tube in advance of the roll, means for relatively advancing the roll longitudinally of the tube and means rotating the tube including a chuck provided with a terminal portion adapted to fit into the end of the tube and an adjacent portion of increased diameter adapted to contact the roll before contact of the roll is established with the tube.

12. In a tube reducing machine, the combination of a pressure roll, means for moving the same along the tube, heating means for heating the tube in advance of the roll, means for relatively advancing the roll longitudinally of the tube and means rotating the tube including a chuck provided with a terminal portion adapted to fit into the end of the tube and an adjacent portion of increased diameter adapted to contact the roll before contact of the roll is established with the tube, said roll being yieldably urged against the chuck.

CLARENCE L. DEWEY.